United States Patent
Chao et al.

(10) Patent No.: US 7,181,305 B2
(45) Date of Patent: Feb. 20, 2007

(54) SYSTEM AND METHOD FOR EXCEPTION MANAGEMENT

(75) Inventors: Jen-Lin Chao, Hsinchu (TW);
Chen-Wei Hsu, Hsinchu (TW);
Wei-Chuan Huang, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 364 days.

(21) Appl. No.: 10/844,085

(22) Filed: May 12, 2004

(65) Prior Publication Data
US 2005/0267617 A1    Dec. 1, 2005

(51) Int. Cl.
*G06F 19/00* (2006.01)
*G06F 17/60* (2006.01)

(52) U.S. Cl. .............. 700/100; 705/7; 705/26
(58) Field of Classification Search ............ 700/96, 700/97, 99, 100, 101; 705/7, 26
See application file for complete search history.

(56) References Cited

U.S. PATENT DOCUMENTS

| 2002/0138316 A1* | 9/2002 | Katz et al. ............ 705/7 |
| 2002/0174000 A1* | 11/2002 | Katz et al. ............ 705/7 |
| 2002/0178077 A1* | 11/2002 | Katz et al. ............ 705/26 |
| 2003/0033179 A1* | 2/2003 | Katz et al. ............ 705/7 |

* cited by examiner

*Primary Examiner*—Leo Picard
*Assistant Examiner*—Douglas S. Lee
(74) *Attorney, Agent, or Firm*—Thomas, Kayden, Horstemeyer & Risley

(57) ABSTRACT

A system for exception management. The system comprises an input/output mechanism, a back-end server, and a management server. The input/output mechanism is configured to interface with a user and receive a requirement to suspend a progressing production. The back-end server provides online service according to the requirement. The management server estimates the impact of the required suspension on the production progress according to the requirement and a preset schedule of the production run.

32 Claims, 4 Drawing Sheets

SYSTEM AND METHOD FOR EXCEPTION MANAGEMENT

BACKGROUND

1. Field of the Invention

The present disclosure relates generally to manufacturing management, and in particular to systems and methods for exception management in a manufacturing environment using networked computer systems.

2. Description of the Related Art

For manufacturers that produce to order, such as most semiconductor manufacturers, clients having placed an order are allowed to interrupt or suspend production processes for the order. In a produce-to-order environment, clients place an order and get a commit date for product delivery. When a client requires a production suspension, an order released to foundry is temporarily taken back until the suspension is lifted. The suspension period, however, is determined by the client regardless of the status of the production progress. When requiring a suspension, the client does not consider potential impact on delivery resulting from the suspension. A commit date is determined according to an original order by considering manufacturing capacity, component inventory, and other factors. Generally, the commit date is a few days later than a scheduled completion date to maintain a buffer period. When the suspension period exceeds the buffer period, either a commit date failure or a rush order insertion occurs. In the former case, commit date failure causes client dissatisfaction, even if the delay results from their suspension request. In the latter case, an overall manufacturing schedule may be disturbed by the inserted rush order, resulting in commit date failures for other clients or additional costs (such as overtime pay).

Hence, there is a need for a manufacturing management system that addresses inefficient exception management arising from the existing technology.

SUMMARY

Accordingly, one object, among others, of the invention is to provide computer-implemented systems and methods for exception management in manufacturing environments.

To achieve the above and other objects, some embodiments of the invention are directed to novel systems and methods for overcoming conventional exception management problems in a manufacturing environment. As such, the present disclosure provides a system for exception management comprising an input/output mechanism, a back-end server, and a management server. The input/output mechanism is configured to interface with a user and receive a requirement to suspend production. The back-end server provides online service according to the requirement. The management server estimates impacts of the required suspension on production according to the requirement and a preset schedule of the production.

The present disclosure also provides a method for exception management in a manufacturing environment. First, preset production schedule and progress status information pertaining to a product are provided. When a requirement is received to suspend production of the product, impact of the required suspension on production progress are estimated according to the requirement and a preset production schedule. The user issuing the requirement is informed of the estimated impact, and can confirm his requirement based on sufficient information.

The above-mentioned method may take the form of program code embodied in a tangible media. When the program code is loaded into and executed by a machine, the machine becomes an apparatus for executing the method.

A detailed description is given in the following embodiments with reference to the accompanying drawings.

BRIEF DESCRIPTION OF THE DRAWINGS

Several embodiments of the present invention can be more fully understood by reading the subsequent detailed description and examples with references made to the accompanying drawings, wherein.

DETAILED DESCRIPTION

Attention is turned to FIGS. 1 through 4, which generally elate to an exception management system in a manufacturing environment. While the preferred embodiment of the invention operates with semiconductor manufacturing systems, it is understood that the type of article processed by the manufacturing system is not critical, and any manufacturing system operating on a produce-to-order basis may be readily substituted.

Figure 1:
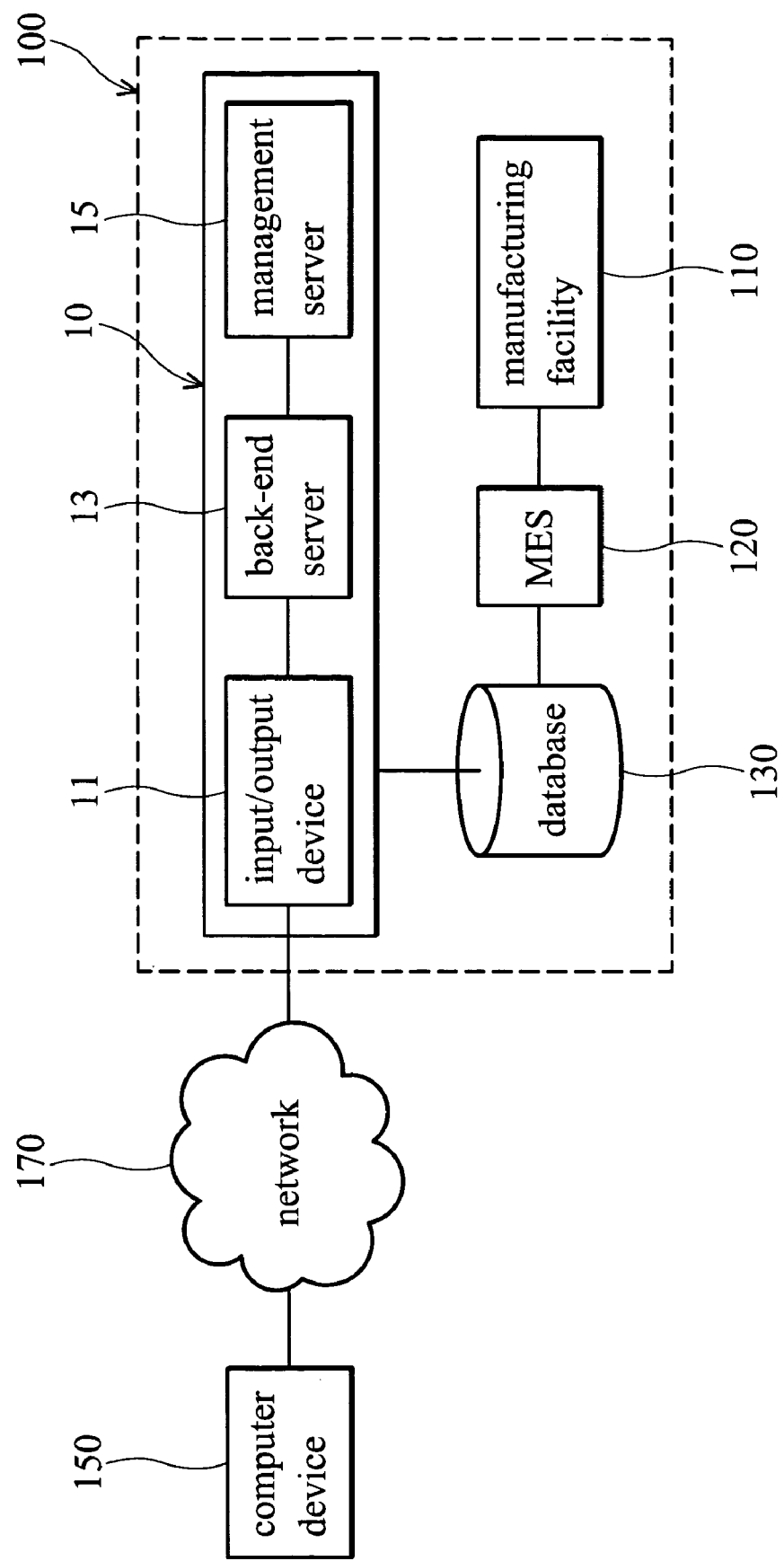
FIG. 1 is a schematic view of a manufacturing management system according to an embodiment of the present invention.

FIG. 1 is a schematic view of a manufacturing system according to an embodiment of the present invention. A manufacturing system 100 comprises an exception management system 10, a manufacturing executive system (MES) 120, and a manufacturing facility 110. The MES 120 directs operation of the manufacturing facility 110 according to a preset schedule stored in a database 130. The MES 120 records progression status of a production run as it is processed in manufacturing facility 110. The progression status is recorded in the database 130. A client, having ordered a product, uses a computer device 150 to communicate with the manufacturing system 100 via a network 170.

The exception management system 10 comprises an input/output device 11, a back-end server 13, and a management server 15. The input/output device 11 is configured to interface with the client without intervention by a human system administrator. The input/output device 11 is also configured to interface with the back-end server 13. In some embodiments, the input/output device 11 may be a network device within the back-end server 13.

The back-end server 13 receives a requirement from the client to suspend a production. That request is received through the input/output device. Upon receiving the request, the back-end server 13 provides one or more services in accordance with the received request. Those services are provided to the client through the input/output device 11. In that regard, the client and the back-end server 13 function in accordance with protocols defined in known client-server environments.

The management server 15 determines the impact of the required suspension on the production progress. That impact is determined according to the requirements and a preset production schedule.

Figure 2:
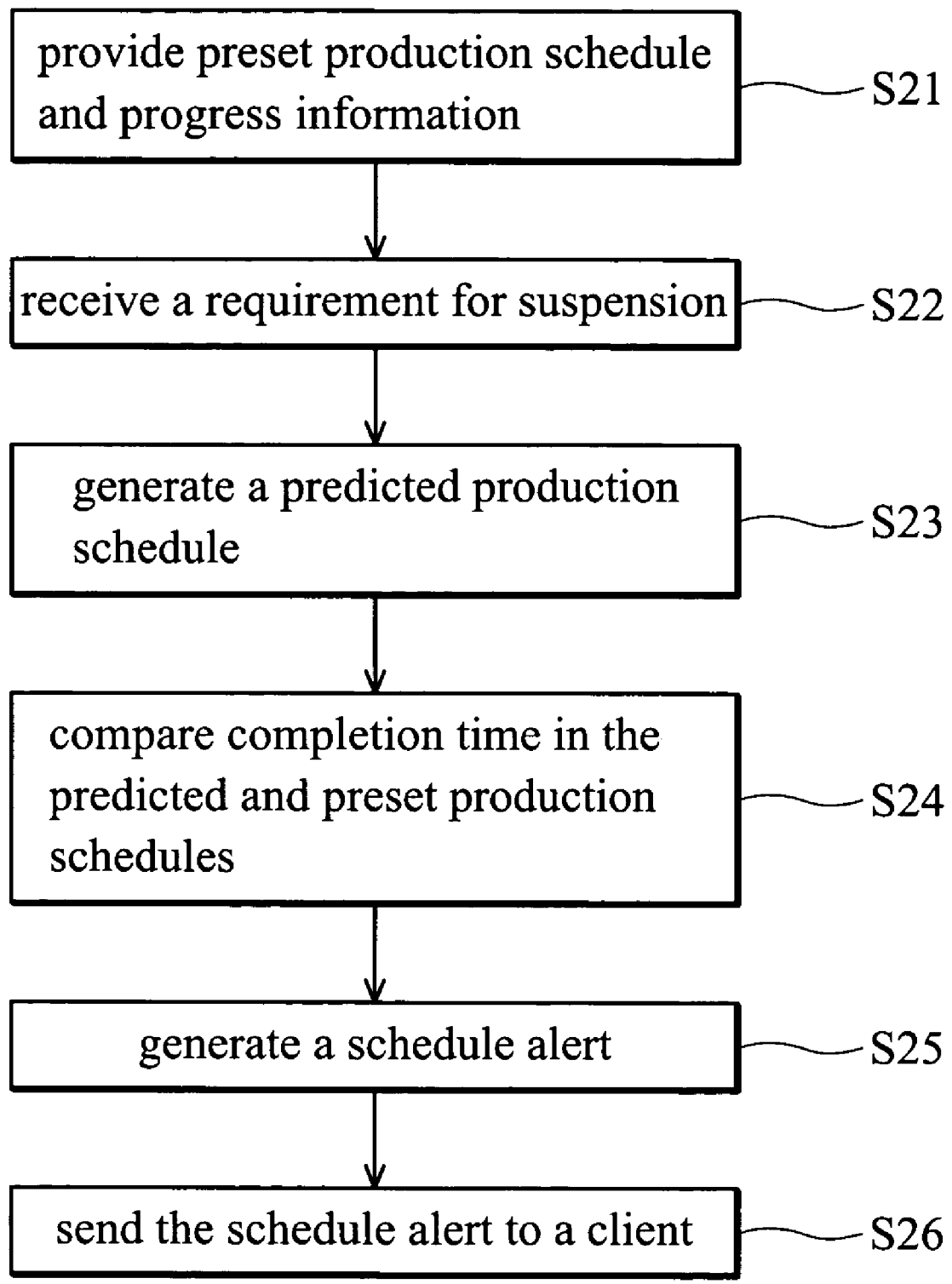
FIG. 2 is a flowchart of the exception management method the system in FIG. 1.

FIG. 2 is a flowchart of the exception management method of the described manufacturing management system. First, preset production schedule and progress information pertaining to a product are provided (step S21). The preset production schedule specifies a product name, amount thereof, and a corresponding commit date. The progress information specifies production status for a product. For example, the progress information comprises work-in-process (WIP) status information of the product. When a client having ordered a product needs to hold the production, he or she sends a requirement for suspension to the manufacturing system 100 through the input/output device 11. When a requirement for suspension is received (step S22), the impact of the required suspension on production progress is determined according to the requirement and a preset production schedule. In step S23, a predicted production schedule is generated according to the requirement. Completion time of the products specified in the predicted production schedule and the master production schedule are then compared (step S24), and a schedule alert is generated when a completion time in the predicted production schedule exceeds a completion time in the preset production schedule (step S25). The schedule alert is sent to the client to aid confirmation of the manufacturing alternation (step S26). The schedule alert specifies whether the suspension requirement will cause a commit date failure. When the client receives the schedule alert, he or she has to determine whether production will be suspended. If suspension is confirmed, a suspension confirmation is then sent to the MES 120. The preset production schedule is then updated accordingly, and the production of the product will be performed according to the updated production schedule.

Figure 3:
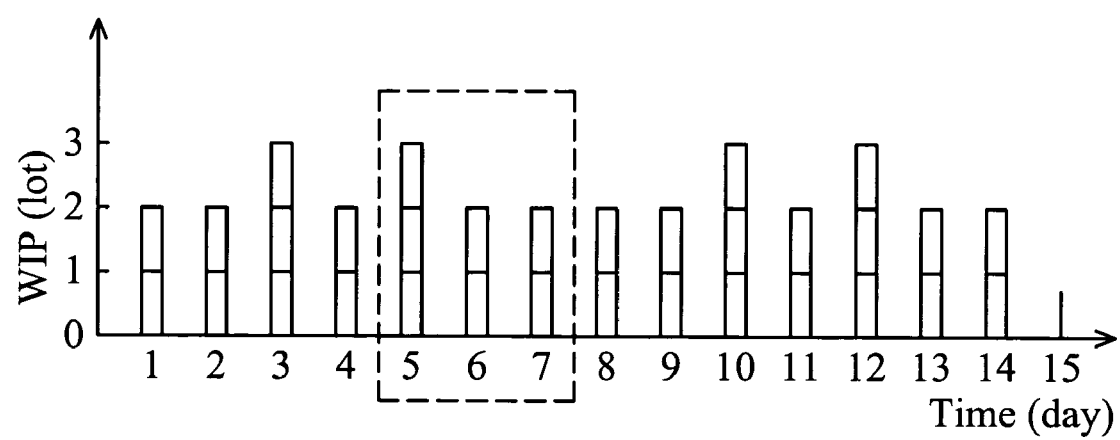
FIG. 3 illustrates the impact manufacturing alternation product delivery.

Using FIG. 3 as an example, an order for 32 lots of wafers is released to a foundry. FIG. 3A illustrates the production schedule for the lots specified in the order. The order is released on Day 0, the production is scheduled to complete on Day 14, and the commit date is on Day 15. A manufacture alternation request is received from a client having submitted the order on Day 4, requesting seven lots scheduled to process on Days 5, 6, and 7 to be put on hold. The manufacture alternation request may be issued for various reasons. For example, when a doubt pertaining to the design for the processed product arises, the client may request to hold the production until the issue in doubt is resolved. According to the embodiment, there are 7 days from the last day of suspended production to the planned completion date. In other words, 7 days remain as a buffer period. According to the embodiment, the client plans to hold production for 9 days. Under the 9-day suspension, the order is split into two parts, one comprising 25 lots remaining on the original master production schedule (MPS) and commit date, the other comprising 7 lots with altered MPS and commit date. A predicted production schedule is also sent to the client as a reminder of the new MPS resulting from the manufacture alternation request. The completion time of the products specified in the predicted production schedule and the master production schedule are compared. A schedule alert is sent to the client to call attention to the changed MPS. The schedule alert specifies whether the manufacture alternation request will impact the MPS or the commit date. When the manufacture alternation request results in a suspension period shorter than the buffer period, then the commit date remains unchanged. When the manufacture alternation request results in a suspension period longer than the buffer period, then the commit date is changed. The schedule alert specifies the impact on the preset schedule resulting from the suspension requirement, thus providing the client with confirmation of the manufacture alternation request.

The method of the various embodiments, or certain aspects or portions thereof, may take the form of program code (i.e. instructions) embodied in a tangible media, such as floppy diskettes, CD-ROMS, hard drives, or any other machine-readable storage medium, wherein, when the program code is loaded into and executed by a machine, such as a computer, the machine becomes an apparatus for practicing the method. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 4:
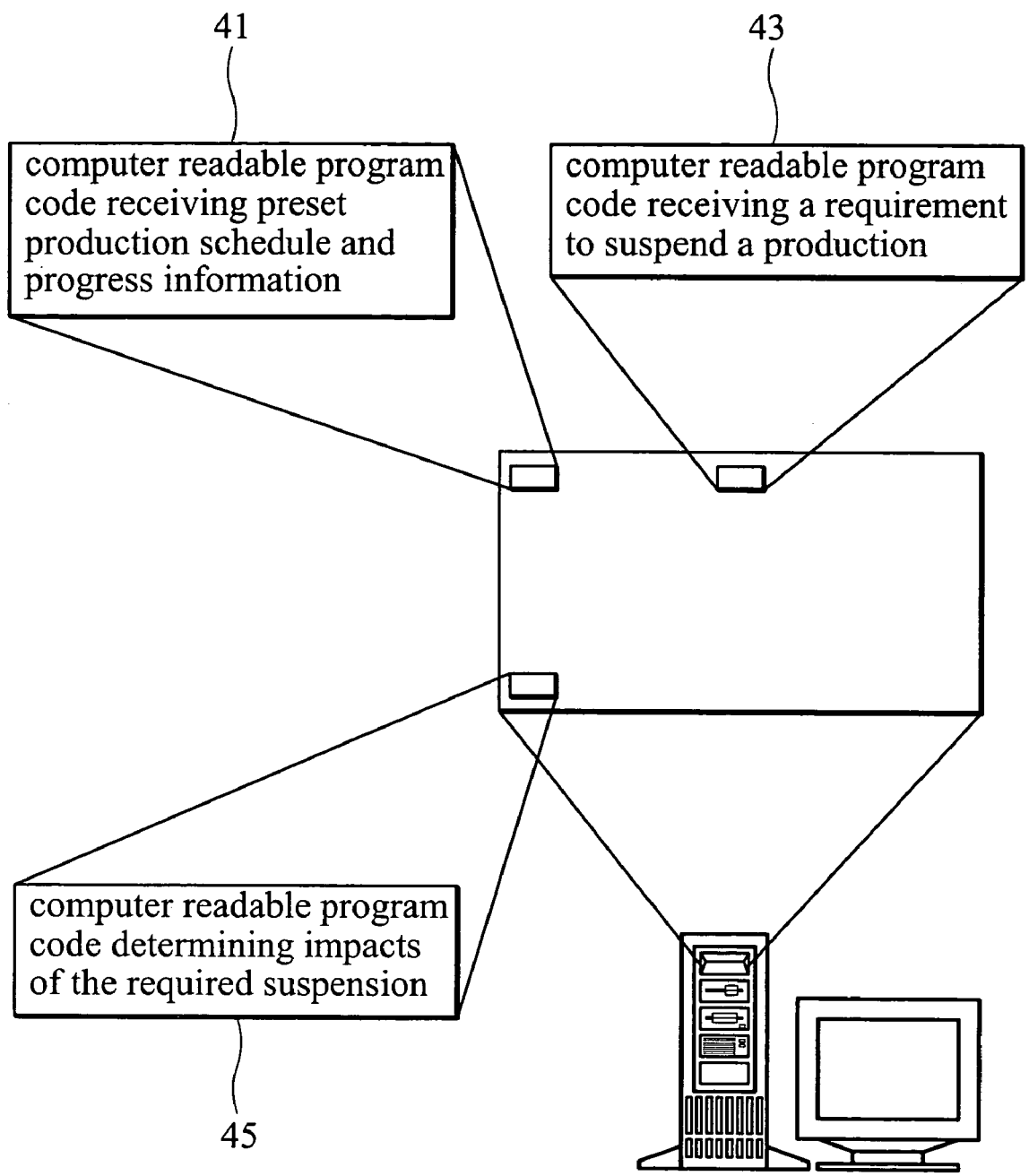
FIG. 4 is a diagram of a storage medium storing a computer program providing the exception management method.

FIG. 4 is a diagram of a storage medium storing a computer program providing the method for exception management. The computer program product comprises a computer usable storage medium having computer readable program code embodied in the medium, the computer readable program code comprising computer readable program code 41 for receiving a preset production schedule and progress information pertaining to a product, computer readable program code 43 for receiving a requirement from a user to suspend a production of the product, and computer readable program code 45 for determining the impact of the required suspension on production progress according to the requirement and a preset production schedule.

While various embodiments of the invention have been described by way of example, it is to be understood that the invention is not limited to the disclosed embodiments. To the contrary, it is intended to cover various modifications and similar arrangements (as would be apparent to those skilled in the art).

What is claimed is:

1. A manufacturing system, comprising:
   a manufacturing management server configured to determine a production schedule according to order information of a product, the manufacturing management server further configured to direct production of the product accordingly;
   a manufacturing facility configured to perform a manufacturing processes of the product according to the production schedule under the control of the manufacturing management server; and
   an exception management server configured to receive a requirement from a user submitting the order information to suspend progress of a production run, to generate a schedule alert according to the production schedule and the requirement, issue an impact notice to inform the user the impact on production due to the requirement, receive a suspension confirmation, the exception management server further configured to modify the production schedule accordingly.

2. The system of claim 1, wherein the manufacturing facility is a semiconductor production facility.

3. The system of claim 1, further comprising a storage device configured to store the production schedule, the storage device further configured to store progress status information of the production run.

4. The system of claim 1, wherein the exception management server is further configured to generate a first schedule alert when the production fails to meet a scheduled delivery time under the suspension.

5. The system of claim 1, wherein the exception management server is further configured to generate a second schedule alert when the production fails to meet a scheduled completion time under the suspension.

6. The system of claim 1, wherein the exception management server is further configured to provide the progress status of the production run in response to a command.

7. The system of claim 1, wherein the exception management server is further configured to provide the production schedule of the production run in response to a command.

8. A computer implemented system for exception management in a manufacturing environment, the system comprising:
   an input/output mechanism configured to interface with a user and receive a requirement to suspend a production progress;
   a back-end server configured to provide online service according to the requirement; and
   a management server configured to estimate the impact of the required suspension on the production progress according to the requirement and a preset schedule of the production run, issue an impact notice to inform the user of the impact on production due to the requirement, and receive suspension confirmation, the management server further being configured to modify the preset schedule accordingly.

9. The system of claim 8, further comprising a storage device configured to store the preset schedule and progress status information of the production run.

10. The system of claim 8, wherein the management server is further configured to generate a first schedule alert when the production fails to meet a scheduled delivery time under the suspension.

11. The system of claim 8, wherein the management sewer is farther configured to generate a second schedule alert when the production fails to meet a scheduled completion time under the suspension.

12. The system of claim 8, wherein the back-end server is further configured to provide the progress status information of the production run in response to a command.

13. The system of claim 8, wherein the back-end server further is farther configured to provide the preset schedule of the production run in response to a command.

14. A method for exception management, comprising the steps of:
   providing a preset schedule and progress status information pertaining to a product;
   receiving a requirement to suspend progress of a production run of the product;
   estimating an impact of the required suspension on the production run according to the requirement and the preset schedule; receiving suspension confirmation; and
   modifying the preset schedule accordingly.

15. The method of claim 14, further comprising the step of storing the preset schedule and progress status information of the production run.

16. The method of claim 14, further comprising the step of issuing an impact notice to inform the user of the impact on production due to the requirement.

17. The method of claim 14, further comprising the step of generating a first schedule alert when the production run fails to meet a scheduled delivery time under the suspension.

18. The method of claim 14, further comprising the step of generating a second schedule alert when the production run fails to meet a scheduled completion time under the suspension.

19. The method of claim 14, further comprising the step of providing the progressing status information of the production run in response to a command.

20. The method of claim 14, further comprising the step of providing the preset schedule of the production run in response to a command.

21. A computer readable storage medium for storing a computer program, the computer program configured to provide a method for exception management in a manufacturing environment, the computer-readable medium comprising:
   computer-readable code adapted to instruct a programmable device to receive a preset schedule and progress status information pertaining to a product;
   computer-readable code adapted to instruct a programmable device to receive a requirement to suspend progress of a production run of the product; and
   computer-readable code adapted to instruct a programmable device to estimate an impact of the required suspension on a production progress according to the requirement and the preset schedule, receive suspension confirmation, and modify the preset schedule accordingly.

22. The storage medium of claim 21, further comprising computer-readable code adapted to instruct a programmable device to store the preset schedule and progress status information of the production run.

23. The storage medium of claim 21, further comprising computer-readable code adapted to instruct a programmable device to issue an impact notice to inform the user of the impact on production due to the requirement.

24. The storage medium of claim 21, further comprising computer-readable code adapted to instruct a programmable device to generate a first schedule alert when the production run fails to meet a scheduled delivery time under the suspension.

25. The storage medium of claim 21, further comprising computer-readable code adapted to instruct a programmable device to generate a second schedule alert when the production run fails to meet a scheduled completion time under the suspension.

26. The storage medium of claim 21, further comprising computer-readable code adapted to instruct a programmable device to provide the progress status information of the production run in response to a command.

27. The storage medium of claim 21, further comprising computer-readable code adapted to instruct a programmable device to provide the preset schedule of the production run in response to a command.

28. A system for exception management in a manufacturing environment, the system comprising:
   a first server configured to provide a service according to a requirement, the requirement resulting in a suspension of a production; and
   a second server configured to estimate an impact of the suspension, the impact being estimated in accordance with the requirement, the impact further being estimated in accordance with a preset schedule of a production run.

29. The system of claim 28, further comprising an input/output mechanism configured to interface the first server with a client.

30. The system of claim 28, further comprising means for interfacing the first server with a client.

31. A system for exception management in a manufacturing environment, the system comprising:

a receiver configured to receive a request to suspend a production, the production running in accordance with a preset schedule; and a processor configured to estimate an impact of suspended production, the impact being estimated in accordance with the request, the impact further being estimated in accordance with the preset schedule.

32. The system of claim 31, further comprising a transmitter configured to transmit the estimated impact.

\* \* \* \* \*